United States Patent
Ma et al.

(10) Patent No.: US 10,613,271 B2
(45) Date of Patent: Apr. 7, 2020

(54) DISPLAY DEVICE WITH HEAT DISSIPATION PLATE

(71) Applicant: Boe Technology Group Co., Ltd., Beijing (CN)

(72) Inventors: Yongda Ma, Beijing (CN); Yuxin Zhang, Beijing (CN); Xinyin Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 15/022,623

(22) PCT Filed: Sep. 6, 2015

(86) PCT No.: PCT/CN2015/088974
§ 371 (c)(1),
(2) Date: Mar. 17, 2016

(87) PCT Pub. No.: WO2016/169182
PCT Pub. Date: Oct. 27, 2016

(65) Prior Publication Data
US 2017/0059769 A1    Mar. 2, 2017

(30) Foreign Application Priority Data
Apr. 24, 2015 (CN) ............... 2015 2 0258482 U

(51) Int. Cl.
*F21V 8/00* (2006.01)
*G02F 1/1333* (2006.01)
*G02F 1/1335* (2006.01)

(52) U.S. Cl.
CPC ..... *G02B 6/0085* (2013.01); *G02F 1/133308* (2013.01); *G02B 6/0055* (2013.01);
(Continued)

(58) Field of Classification Search
CPC combination set(s) only.
See application file for complete search history.

(56) References Cited

U.S. PATENT DOCUMENTS 8,593,041 B1    11/2013  Wu
2012/0327617 A1*  12/2012  Maeyama ......... G02F 1/133308
                                                 361/752
(Continued)

FOREIGN PATENT DOCUMENTS

CN    201237679    5/2009
CN    102620204    8/2012
(Continued)

OTHER PUBLICATIONS

International Search Report and Written Opinion from PCT/CN15/88974 dated Jan. 12, 2016.
(Continued)

*Primary Examiner* — Lauren Nguyen
(74) *Attorney, Agent, or Firm* — Calfee, Halter & Griswold LLP

(57) ABSTRACT

A backlight module and a display panel. The backlight module comprises a light guide plate, a heat dissipation plate and a light source. The display panel comprises a liquid crystal screen and a circuit board connected with the liquid crystal screen, the liquid crystal screen and the circuit board are arranged parallel to an arrangement direction of the heat dissipation plate main body and are respectively arranged at two sides of the heat dissipation plate. By means of the display device, the heat conducted to the back plate in the region of the heat dissipating plate corresponding to the circuit board can be reduced, and the temperature of the region where the circuit board locates can be reduced, thereby preventing aging of the electronic component and prolonging the lifetime of the circuit board.

19 Claims, 4 Drawing Sheets

(52) U.S. Cl.
CPC ............ *G02B 6/0068* (2013.01); *G02F 2001/133314* (2013.01); *G02F 2001/133317* (2013.01); *G02F 2001/133628* (2013.01)

(56) References Cited

U.S. PATENT DOCUMENTS

2013/0278857 A1* 10/2013 Zeng .................. G02B 6/0085
349/58
2016/0282547 A1    9/2016 Guo et al.

FOREIGN PATENT DOCUMENTS

| | | |
|---|---|---|
| CN | 102809841 | 12/2012 |
| CN | 203223889 | 10/2013 |
| CN | 103925531 | 7/2014 |
| CN | 204084274 U | 1/2015 |
| CN | 204536695 | 8/2015 |
| WO | 2014032273 A1 | 3/2014 |

OTHER PUBLICATIONS

First Office Action from Indian Patent Application No. 201747002637 dated Dec. 2, 2019.

* cited by examiner

DISPLAY DEVICE WITH HEAT DISSIPATION PLATE

RELATED APPLICATIONS

The present application is the U.S. national phase entry of PCT/CN2015/088974, with an international filling date of Sep. 6, 2015, which claims the benefit of Chinese Patent Application No. 201520258482.0, filed on Apr. 24, 2015, the entire disclosure of which are incorporated herein by reference.

FIELD OF THE INVENTION

The present invention belongs to the field of display technology, particularly to a display device.

BACKGROUND OF THE INVENTION

Since the liquid crystal itself does not emit light, a back light module (BLM) is generally used in the liquid crystal display (LCD) for providing uniform light source for the liquid crystal screen, so as to realize image display. Based on different arrangement positions of the light source in the back light module, the back light module is classified into side type back light module and direct type back light module, wherein the light source in the side type back light module is located at the side of the display panel, the light source in the direct type back light module is located at the bottom of the display panel.

The existing back light module generally uses a light emitting diode (LED) as the light source, the LED is a low heat luminous body, however, a large amount of LEDs that are lit up for a long time will also generate a lot of heat; meanwhile, for the convenience of power supply connection, a printed circuit board (PCB) for supplying power and signal source driving for the liquid crystal screen in the display panel is connected with the liquid crystal screen and is arranged on the back plate, during operation of the display device, the PCB will also generate certain heat. In order to ensure normal operation of the display device, heat dissipation holes are generally provided on the shell at the back of the display device, and the light source and the PCT are arranged in a heat dissipation chamber formed between the back plate and the shell.

In order to enable the structure of the display device to be thin, in the existing side type back light module, the heat generated by the light source and the heat generated by the PCB are collected simultaneously and conducted through a same heat dissipation plate, and the back plate under the light bar supports the PCB directly. Since the heat dissipation plate does not distinguish the heat emanated by the light bar and the PCB, and generally the heat emanated by the light bar is greater than the heat emanated by the PCB, the heat that is directly conducted to the back plate will cause the PCB located at the back plate to have a relatively large heat dissipation pressure, which accelerates aging of the PCB and the electronic components thereon, and reduces the use lifetime of the display device.

It shows that designing a back light module that can increase the heat dissipating effect and prevent aging of the PCB and the electronic components thereon on the basis of ensuring a compact structure has become a technical problem that needs to be solved urgently at present.

SUMMARY OF THE INVENTION

The technical problem to be solved by the present invention is to provide a display device with respect to the above defects existing in the prior art, wherein, by arranging an arch structure on the heat dissipation plate, the heat conducted to the back plate in the region of the heat dissipating plate corresponding to the circuit board can be reduced, the temperature of the region where the circuit board locates can be reduced, thereby preventing aging of the electronic component and prolonging the lifetime of the circuit board.

According to an aspect of the present invention, a display device is provided, comprising a backlight module and a display panel, the backlight module comprises a light guide plate, a heat dissipation plate and a light source, the heat dissipation plate comprises a heat dissipation plate main body and a heat dissipation plate side body, the heat dissipation plate side body is perpendicular to the heat dissipation plate main body and is connected with the heat dissipation plate main body at at least one side of the heat dissipation plate main body; the display panel comprises a liquid crystal screen and a circuit board connected with the liquid crystal screen, the liquid crystal screen and the circuit board are arranged parallel to an arrangement direction of the heat dissipation plate main body and are respectively arranged at two sides of the heat dissipation plate; a distance between at least one portion of a region of the heat dissipation plate main body corresponding to the circuit board and the liquid crystal screen is less than a distance between other regions of the heat dissipation plate main body and the liquid crystal screen.

In some embodiments, in the region of the heat dissipation plate main body corresponding to the circuit board, an arch structure facing towards the liquid crystal screen is formed relative to a plane where the circuit board locates.

In some embodiments, the display device further comprises a back plate, the circuit board is arranged at a side of the back plate away from the heat dissipation plate, and corresponds to the arch structure of the heat dissipation plate.

In some embodiments, the arch structure is a single arch structure; or the arch structure can also be a multi-arch structure comprising at least two connected holes.

In some embodiments, a bottom of a connecting portion of adjacent holes of the multi-arch structure is in contact with the back plate when the arch structure is a multi-arch structure comprising at least two connected holes.

In some embodiments, the light guide plate is arranged between the heat dissipation plate and the liquid crystal screen, an arrangement direction of a top of the arch structure is parallel to an arrangement direction of the light guide plate, the top of the arch structure is provided with contact components distributed at intervals and configured in concave and convex, and the top of the arch structure is in contact with a bottom of the light guide plate through the contact components.

In some embodiments, the backlight module further comprises a bottom reflective sheet, the bottom reflective sheet is arranged in parallel with the light guide plate and is located between the light guide plate and the heat dissipation plate, an arrangement region of the bottom reflective sheet at least corresponds to a center region of the light guide plate.

In some embodiments, the arrangement direction of the top of the arch structure is parallel to the arrangement direction of the bottom reflective sheet, the top of the arch structure is provided with groove structures or protrusion structures distributed at intervals, and the top of the arch structure is in contact with a bottom of the bottom reflective sheet.

In some embodiments, the light source is arranged on the heat dissipation plate side body, and is located at at least one side of the light guide plate.

In some embodiments, the heat dissipation plate main body and the back plate are connected through a screw or are connected by riveting directly.

The beneficial effect of the present invention is: in the display device, by forming an arch structure in a region of the heat dissipation plate of the backlight module corresponding to the circuit board, conducting partly the heat generated by the light source e.g. light bar to the inner space of the back plate close to the display device. On the one hand, a better heat dissipating effect can be achieved; on the other hand, the region of the back plate corresponding to the circuit board is made not to be in contact with the heat dissipation plate, thereby solving the problem that the heat is concentrated when the light entrance side of the side type backlight module is same as the data line lead-out side of the circuit board of the display panel, releasing the heat dissipation pressure of the circuit board region, and increasing the use lifetime of the display device.

DETAILED DESCRIPTION OF THE INVENTION

In order to enable the skilled person in the art to understand the technical solution of the present invention better, next, the display device of the present invention will be described in more details with reference to the drawings and the specific implementing modes. The following reference signs will be used throughout the specification and accompanying figures:

11—heat dissipation plate, 111—heat dissipation plate main body, 112—heat dissipation plate side body, 113—arch structure, 115—protrusion structure, 116—groove structure, 12—light bar, 13—light guide plate, 14—bottom reflective sheet, 15—optical film material, 21—liquid crystal screen, 22—circuit board, 31—back plate, 32—module frame.

A first embodiment provides a display device which solves the problem of concentrated heat dissipation when the data line lead-out side of the circuit board of the display panel and the light source of the side type back light module are at the same side, and increases the use lifetime of the display device.

Figure 1:
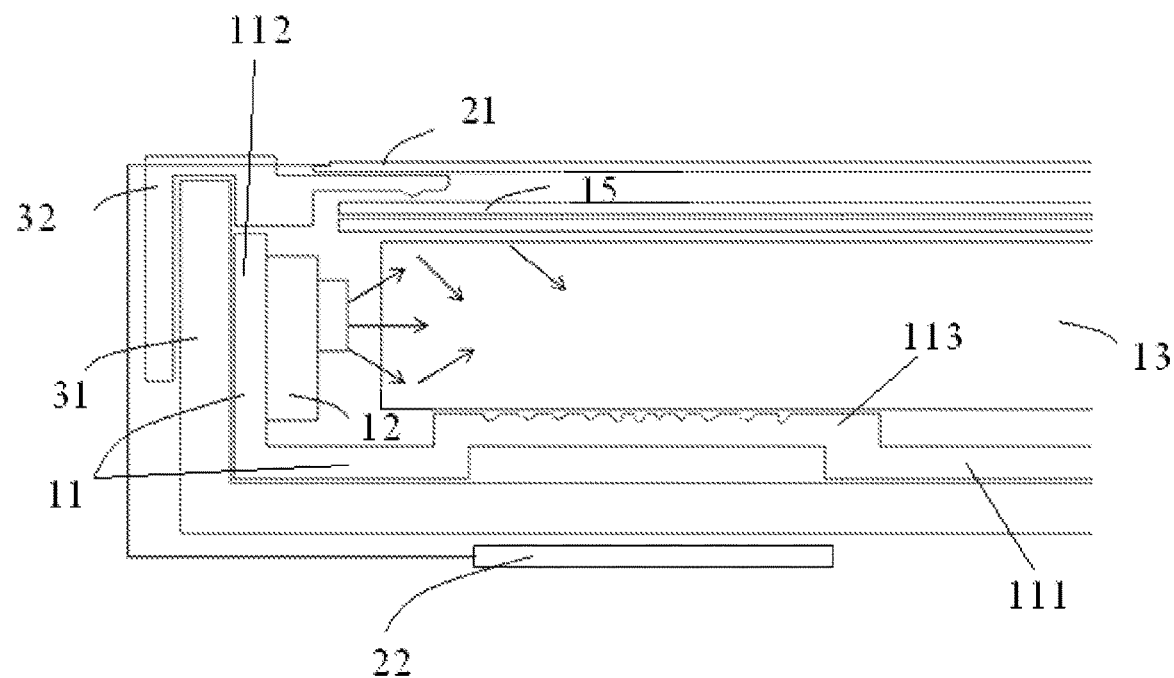
FIG. 1 is a structural schematic view of a display device in Embodiment 1 of the present invention.

As shown in FIG. 1, the display device comprises a backlight module and a display panel, wherein the backlight module comprises a light guide plate 13, a heat dissipation plate 11 and a light source (e.g., a light bar 12 in FIG. 1), the heat dissipation plate 11 comprises a heat dissipation plate main body 111 and a heat dissipation plate side body 112, the heat dissipation plate side body 112 is perpendicular to the heat dissipation plate main body 111 and is connected with the heat dissipation plate main body 111 at at least one side of the heat dissipation plate main body 111; the display panel comprises a liquid crystal screen 21 and a circuit board 22 (the circuit board 22 for example may be PCB or FPC) connected with the liquid crystal screen 21, the liquid crystal screen 21 and the circuit board 22 are arranged parallel to an arrangement direction of the heat dissipation plate main body 111 and are respectively arranged at two sides of the heat dissipation plate 11; wherein a distance between at least one portion of a region of the heat dissipation plate main body 111 corresponding to the circuit board 22 and the liquid crystal screen 21 is less than a distance between other regions of the heat dissipation plate main body 111 and the liquid crystal screen 21.

For example, the heat dissipation plate 11 in this embodiment can be an L-shaped structure (forming the heat dissipation plate side body 112 at one side of the heat dissipation plate main body 111) which forms an opening at a side facing towards the liquid crystal screen 21 or a concave structure (forming the heat dissipation plate side body 112 at both of the two opposite sides of the heat dissipation plate main body 111). Moreover, the L-shaped structure or the concave structure is further provided with an arch facing towards the liquid crystal screen 21 at a side opposite to the opening.

In FIG. 1, in the region of the heat dissipation plate main body 111 corresponding to the circuit board 22, an arch structure 113 facing towards the liquid crystal screen 21 is formed relative to a plane where the circuit board 22 locates. In this embodiment, the arch structure 113 is a single arch structure.

The light guide plate 13 is arranged between the heat dissipation plate 11 and the liquid crystal screen 21, a light source is arranged on the heat dissipation plate side body 112 and is located at at least one side of the light guide plate 13. For example, a heat dissipation plate 11 in a concave structure with two heat dissipation plate side bodies 112 can be used to arrange two light sources respectively on the heat dissipation plate side bodies 112 at two sides of the concave structure; or, two heat dissipation plates 11 of L-shaped structure can be used, each heat dissipation plate 11 of L-shaped structure only has one heat dissipation plate side body 112, one light source is arranged on the heat dissipation plate side body 112 of each heat dissipation plate 11.

Further, in this embodiment, an arrangement direction of a top of the arch structure 113 is parallel to an arrangement direction of the light guide plate 13, the top of the arch structure 113 is provided with contact components distributed at intervals and configured in concave and convex, and the top of the arch structure 113 is in contact with a bottom of the light guide plate 13 through the contact components.

Figure 2:
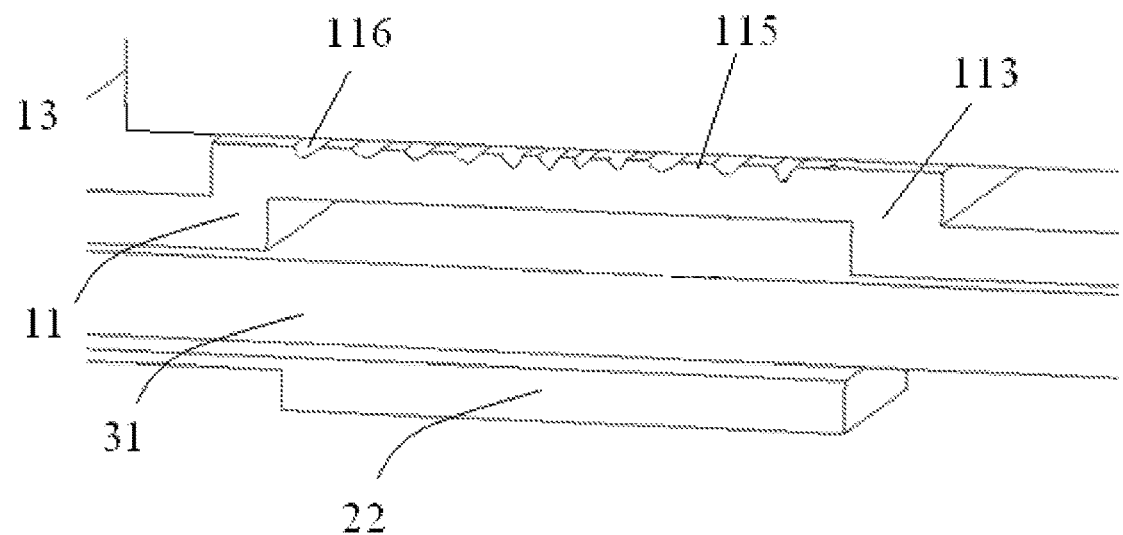
FIG. 2 is a structural schematic view of local amplification of the display device in FIG. 1.
Figure 3:
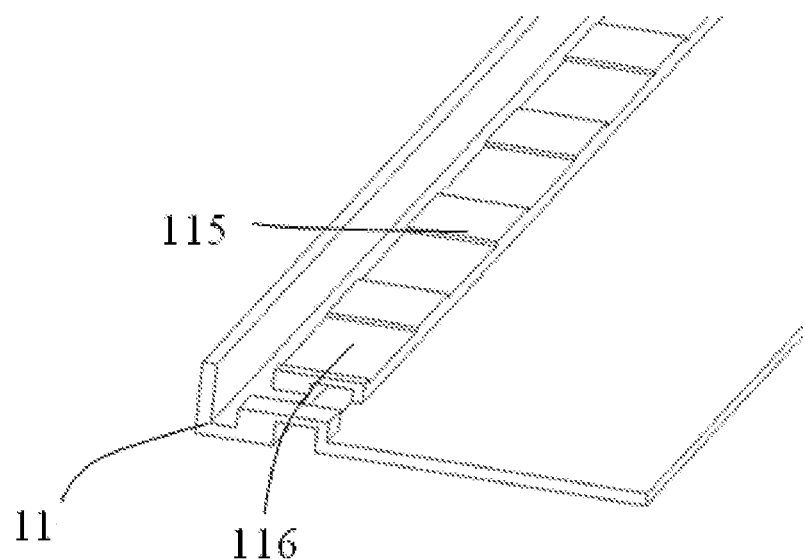
FIG. 3 is a structural schematic view of protrusion structures or groove structures in FIG. 2.

The contact components include protrusion structures and groove structures. FIG. 2 is a local amplification view of FIG. 1. From FIG. 2, it can be seen clearly that the top region is provided with protrusion structures 115 and groove structures 116 distributed at intervals. The protrusion structures 15 and the groove structures 116, for example, can be parallel to the side surface of the light bar respectively. As shown in FIG. 3, the protrusion structures 15 and the groove structures 116 can also be arranged at intervals and perpendicular to the side surface of the light bar respectively.

Figure 4:
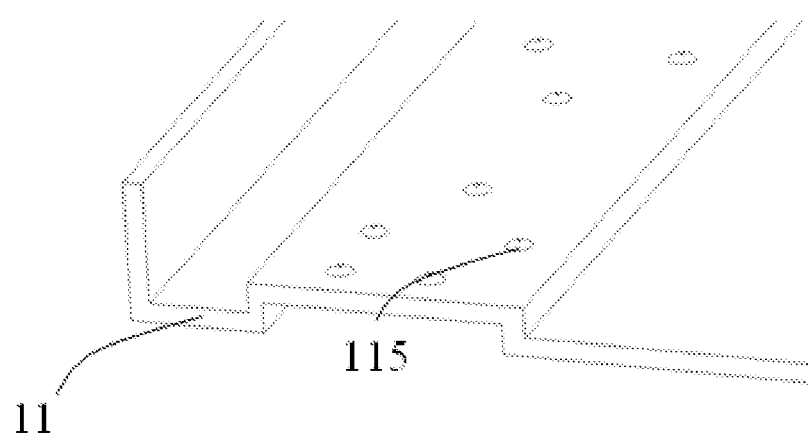
FIG. 4 is another structural schematic view of protrusion structures or groove structures in FIG. 2.

It should be apparent that the contact components in the top region can also be as shown in FIG. 4, only protrusion structures 115 are arranged on the upper surface thereof. Here, by arranging the arch structure 113 facing towards the liquid crystal screen 21 in the region of the heat dissipation plate 11 corresponding to the circuit board 22, and arranging contact components in the region of the top of the arch structure 113 in contact with the bottom of the light guide plate 13 so as to reduce the contact area of the heat dissipation plate 11 and the light guide plate 13, the influence of conducting heat by the heat dissipation plate 11 to the light guide plate 13 is reduced.

In addition, it can be seen from FIG. 1 that the backlight module in this embodiment can further comprise an optical film material 15, the optical film material 15 can make the backlight module to obtain more uniform backlight with appropriate brightness.

In FIG. 1, the display device further comprises a back plate 31. Optionally, the heat dissipation plate main body 111 and the back plate 31 are connected through a screw or are connected by riveting directly, whereas the circuit board 22 is arranged at a side of the back plate 31 away from the heat dissipation plate 11, and the region of the back plate 31 in which the circuit board 22 is arranged is separated from the heat dissipation plate 11. The heat generated by the light bar 12 is conducted to the back plate 31 through the heat dissipation plate 11. On the one hand, since the actual effective heat dissipation volume of the heat dissipation plate 11 is increased, a better heat dissipating effect can be achieved. On the other hand, in general cases, since the thermal conductivity of air is far less than the thermal conductivity of metal, it can be effectively ensured that the region where the circuit board 22 locates is not influenced by large amount of heat, thereby preventing aging of the electronic component and ensuring lifetime of the circuit board.

Certainly, in order to fix the liquid crystal screen 21 and keep an appropriate distance between the liquid crystal screen 21 and the backlight module, the display device further comprises a module frame 32.

It is easy to understand that in the display device of this embodiment, the backlight module can be a unilateral light entrance or a bilateral light entrance based on the brightness requirement of the liquid crystal screen 21. For example, an LED light bar 12 can be assembled on one heat dissipation plate side body of one heat dissipation plate 11, or LED light bars 12 can be assembled on two opposite heat dissipation plate side bodies of one heat dissipation plate 11, or the LED light bars 12 can be assembled on side bodies of two heat dissipation plates 11 respectively, which will not be defined here.

In the display device of this embodiment, by arranging an arch structure on the heat dissipation plate, not only can better heat dissipating effect be achieved, but also the heat conducted to the back plate in a region of the heat dissipation plate corresponding to the circuit board can be reduced, and the temperature of the region where the circuit board locates can be reduced, thereby preventing aging of the electronic component and prolonging the lifetime of the circuit board.

In a second embodiment, a display device is provided. The difference between this embodiment and the first embodiment lies in that the arch structure in the heat dissipation plate main body is different.

Figure 5:
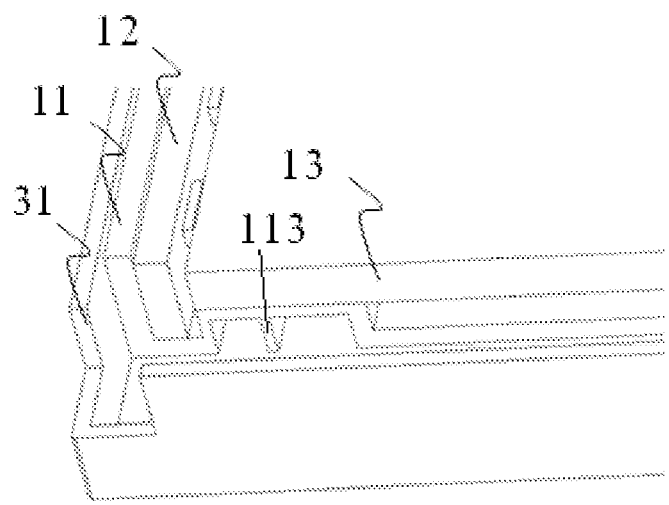
FIG. 5 is a structural schematic view of a display device in Embodiment 2 of the present invention.

In this embodiment, in the region of the heat dissipation plate main body 111 corresponding to the circuit board 22, a multi-arch structure 113 comprising at least two connected holes facing towards the liquid crystal screen 21 is formed relative to a plane where the circuit board 22 locates. In this embodiment, the arch structure 113 is a single arch structure. For example, as shown in FIG. 5, the arch structure 113 of the heat dissipation plate 11 in this embodiment can be a double-arch structure. Certainly, the arch structure 113 can also be a multi-arch structure, this can be designed flexibly based on the size of the circuit board region or the heat dissipation requirement, which will not be defined here.

Further, when the arch structure 113 is a multi-arch structure comprising at least two connected holes, a bottom of a connecting portion of adjacent holes of the arch structure 113 is in contact with the back plate 31 so as to achieve a better supporting effect.

In the display device of this embodiment, other structures in the display panel and the backlight module are same as the corresponding structure of the display device in Embodiment 1, which will not be elaborated here. Similarly, in order to reduce the influence of the heat dissipation plate 11 to the light guide plate 13, the top of the arch structure 113 can be provided with contact components distributed at intervals and configured in concave and convex, and the top of the arch structure 113 is in contact with the bottom of the light guide plate 13 through the contact components, which also will not be further elaborated.

In the display device of this embodiment, by arranging an arch structure on the heat dissipation plate, not only a better heat dissipating effect can be achieved, but also the heat conducted to the back plate in a region of the heat dissipation plate corresponding to the circuit board can be reduced, the temperature of the region where the circuit board locates can be reduced, thereby preventing aging of the electronic component and prolonging the lifetime of the circuit board.

In a third embodiment, a display device is provided. The difference between this embodiment and the first two embodiments lies in that the backlight module in this embodiment further comprises a bottom reflective sheet. By arranging the bottom reflective sheet, the light source can be utilized better so as to improve utilization rate of light.

Figure 6:
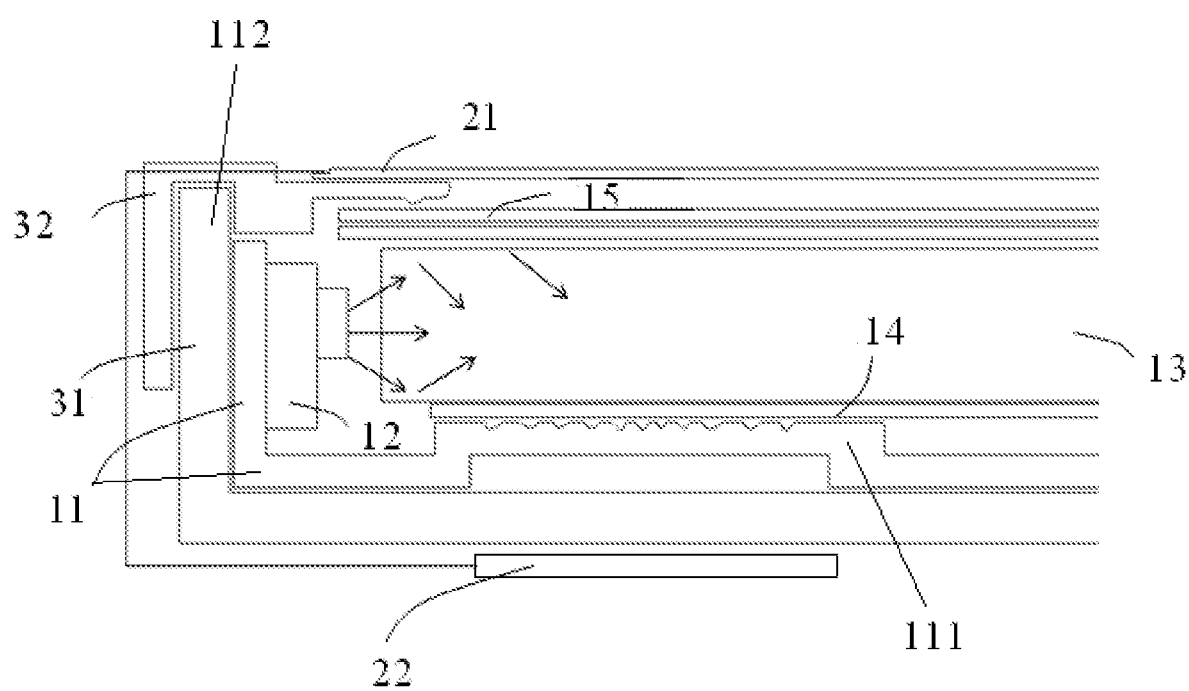
FIG. 6 is a structural schematic view of a display device in Embodiment 3 of the present invention.

As shown in FIG. 6, the backlight module further comprises a bottom reflective sheet 14. The bottom reflective sheet 14 is arranged in parallel with the light guide plate 13 and is located between the light guide plate 13 and the heat dissipation plate 11. An arrangement region of the bottom reflective sheet 14 at least corresponds to a center region of the light guide plate 13. That is, the bottom reflective sheet 14 is mounted between the light guide plate 13 and the heat dissipation plate 11, the area thereof can be equal to or slightly smaller than the area of the light guild plate 13 (as shown in FIG. 6).

In this embodiment, the arrangement direction of the top of the arch structure 113 is parallel to the arrangement direction of the bottom reflective sheet 14, the top of the arch structure 113 is provided with groove structures or protrusion structures distributed at intervals, and the top of the arch structure 113 is in contact with a bottom of the bottom reflective sheet 14.

Figure 7:
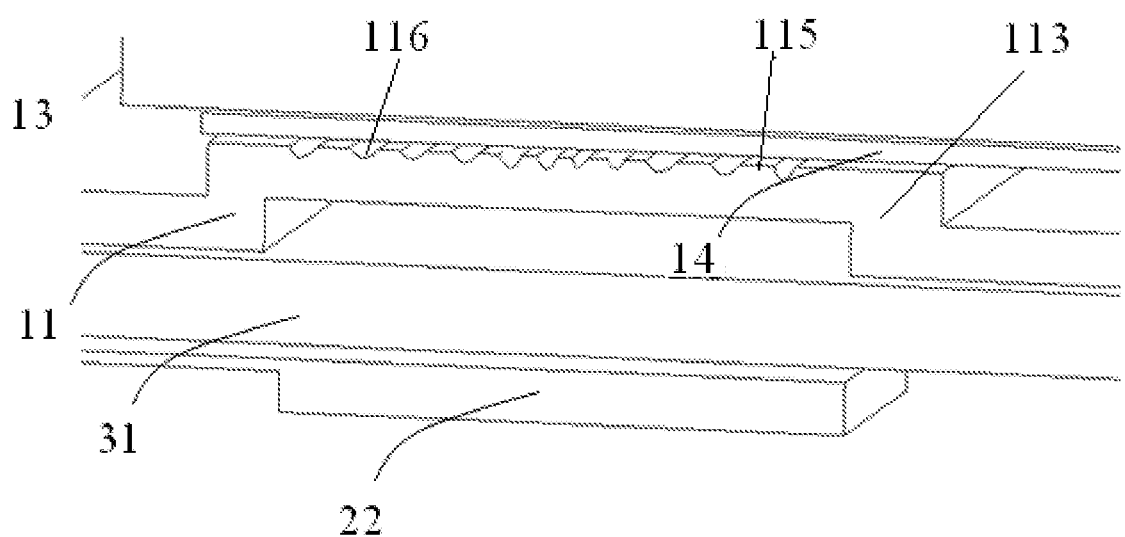
FIG. 7 is a structural schematic view of local amplification of the display device in FIG. 6.

FIG. 6 takes the heat dissipation plate of a single arch structure in Embodiment 1 as an example, FIG. 7 is a local amplification view of FIG. 6. The region of the heat dissipation plate 11 corresponding to the circuit board 22 arches towards the liquid crystal screen 21; meanwhile, the contact region of the top of the arch structure and the bottom of the bottom reflective sheet 14 is further provided with protrusion structures 115, so as to reduce the contact area of the heat dissipation plate 11 and the bottom reflective sheet 14, and reduce conduction of heat on the heat dissipation plate 11 to the bottom reflective sheet 14, thereby reducing the heat conducted by the dissipation plate 11 to the light guide plate 13 and reduce the risk of deformation of the light guide plate 13 at the light entrance side (i.e., the side close to the light bar) due to being heated.

In the display device of this embodiment, other structures in the display panel and the backlight module are same as the corresponding structure of the display device in Embodiment 1 or Embodiment 2, which will not be elaborated here.

Just as in the first and second embodiments, in the display device of this embodiment, by arranging an arch structure on the heat dissipation plate, not only a better heat dissipating effect can be achieved, but also the heat conducted to the back plate in a region of the heat dissipation plate corresponding to the circuit board can be reduced, the temperature of the region where the circuit board locates can be reduced, thereby preventing aging of the electronic component and prolonging the lifetime of the circuit board.

In the display device of the three embodiments, by forming an arch structure in a region of the heat dissipation plate of the backlight module corresponding to the circuit board, conducting partly the heat generated by the light source e.g. light bar to the inner space of the back plate close to the display device. On the one hand, a better heat dissipating effect can be achieved; on the other hand, the region of the back plate corresponding to the circuit board is made not to be in contact with the heat dissipation plate, thereby solving the problem that the heat is concentrated when the light entrance side of the side type backlight module is same as the data line lead-out side of the circuit board of the display panel, releasing the heat dissipation pressure of the circuit board region, and increasing the use lifetime of the display device.

It can be understood that the above implementing modes are only exemplary implementing modes used for explaining the principle of the present invention, however, the present invention is not limited to this. For the ordinary skilled person in the art, in the case of not departing from spirit and essence of the present invention, various modifications and improvements can be made, these modifications and improvements should also be regarded as the protection scopes of the present invention.

The invention claimed is:

1. A display device comprising:
a backlight module, a display panel and a back plate, wherein the backlight module comprises a light guide plate, a heat dissipation plate and a light source, the heat dissipation plate comprises a heat dissipation plate main body and a heat dissipation plate side body, the heat dissipation plate side body is perpendicular to the heat dissipation plate main body and is connected with the heat dissipation plate main body on at least one side of the heat dissipation plate main body; wherein the display panel comprises a liquid crystal screen and a circuit board connected with the liquid crystal screen, wherein the circuit board and an arrangement direction of the heat dissipation plate main body are parallel to the liquid crystal screen, and the circuit board and the liquid crystal screen are respectively arranged at two opposite sides of the heat dissipation plate main body, separated by a line along the arrangement direction of the heat dissipation plate main body; wherein the circuit board is arranged at a side of the back plate away from the heat dissipation plate, wherein a distance between at least one portion of a region of the heat dissipation plate main body corresponding to the circuit board and the back plate is more than a distance between other regions of the heat dissipation plate main body not corresponding to the circuit board and the back plate, to release the heat dissipation pressure of the region of the heat dissipation plate main body corresponding to the circuit board.

2. The display device according to claim 1, wherein in the region of the heat dissipation plate main body corresponding to the circuit board, an arch structure facing towards the liquid crystal screen is formed relative to a plane where the circuit board locates, and an orthographic projection of the arch structure on a plane in which the liquid crystal panel is located at least partially overlaps an orthographic projection of the circuit board on the plane in which the liquid crystal panel is located.

3. The display device according to claim 2, wherein the circuit board corresponds to the arch structure of the heat dissipation plate.

4. The display device according to claim 3, wherein the arch structure is a single arch structure.

5. The display device according to claim 3, wherein the arch structure is a multi-arch structure comprising at least two connected holes.

6. The display device according to claim 5, wherein a bottom of a connecting portion of adjacent holes of the multi-arch structure is in contact with the back plate.

7. The display device according to claim 2, wherein the light guide plate is arranged between the heat dissipation plate and the liquid crystal screen, an arrangement direction of a top of the arch structure is parallel to an arrangement direction of the light guide plate, the top of the arch structure is provided with contact components distributed at intervals and configured in concave and convex, and the top of the arch structure is in contact with a bottom of the light guide plate through the contact components.

8. The display device according to claim 3, wherein the light guide plate is arranged between the heat dissipation plate and the liquid crystal screen, an arrangement direction of a top of the arch structure is parallel to an arrangement direction of the light guide plate, the top of the arch structure is provided with contact components distributed at intervals and configured in concave and convex, and the top of the arch structure is in contact with a bottom of the light guide plate through the contact components.

9. The display device according to claim 4, wherein the light guide plate is arranged between the heat dissipation plate and the liquid crystal screen, an arrangement direction of a top of the arch structure is parallel to an arrangement direction of the light guide plate, the top of the arch structure is provided with contact components distributed at intervals and configured in concave and convex, and the top of the arch structure is in contact with a bottom of the light guide plate through the contact components.

10. The display device according to claim 5, wherein the light guide plate is arranged between the heat dissipation plate and the liquid crystal screen, an arrangement direction of a top of the arch structure is parallel to an arrangement direction of the light guide plate, the top of the arch structure is provided with contact components distributed at intervals and configured in concave and convex, and the top of the arch structure is in contact with a bottom of the light guide plate through the contact components.

11. The display device according to claim 6, wherein the light guide plate is arranged between the heat dissipation plate and the liquid crystal screen, an arrangement direction of a top of the arch structure is parallel to an arrangement direction of the light guide plate, the top of the arch structure is provided with contact components distributed at intervals and configured in concave and convex, and the top of the arch structure is in contact with a bottom of the light guide plate through the contact components.

12. The display device according to claim 2, wherein the backlight module further comprises a bottom reflective sheet, the bottom reflective sheet is arranged in parallel with the light guide plate and is located between the light guide plate and the heat dissipation plate, an arrangement region of the bottom reflective sheet at least corresponds to a center region of the light guide plate.

13. The display device according to claim 3, wherein the backlight module further comprises a bottom reflective sheet, the bottom reflective sheet is arranged in parallel with the light guide plate and is located between the light guide plate and the heat dissipation plate, an arrangement region of the bottom reflective sheet at least corresponds to a center region of the light guide plate.

14. The display device according to claim 4, wherein the backlight module further comprises a bottom reflective sheet, the bottom reflective sheet is arranged in parallel with the light guide plate and is located between the light guide plate and the heat dissipation plate, an arrangement region of the bottom reflective sheet at least corresponds to a center region of the light guide plate.

15. The display device according to claim 5, wherein the backlight module further comprises a bottom reflective sheet, the bottom reflective sheet is arranged in parallel with the light guide plate and is located between the light guide plate and the heat dissipation plate, an arrangement region of the bottom reflective sheet at least corresponds to a center region of the light guide plate.

16. The display device according to claim 6, wherein the backlight module further comprises a bottom reflective sheet, the bottom reflective sheet is arranged in parallel with the light guide plate and is located between the light guide plate and the heat dissipation plate, an arrangement region of the bottom reflective sheet at least corresponds to a center region of the light guide plate.

17. The display device according to claim 12, wherein the arrangement direction of the top of the arch structure is parallel to the arrangement direction of the bottom reflective sheet, the top of the arch structure is provided with groove structures or protrusion structures distributed at intervals, and the top of the arch structure is in contact with a bottom of the bottom reflective sheet.

18. The display device according to claim 1, wherein the light source is arranged on the heat dissipation plate side body, and is located at least one side of the light guide plate.

19. The display device according to claim 3, wherein the heat dissipation plate main body and the back plate are connected through a screw or are connected by riveting directly.

* * * * *